UNITED STATES PATENT OFFICE.

HUGO JAESSCHIN, OF BERLIN, AND OSKAR KALTWASSER, OF DESSAU, GERMANY, ASSIGNORS TO ACTIEN GESELLSCHAFT FÜR ANILIN FABRIKATION, OF BERLIN, GERMANY.

MONOAZO DYE.

1,003,266.      Specification of Letters Patent.      Patented Sept. 12, 1911.

No Drawing.      Application filed May 1, 1911. Serial No. 624,513.

*To all whom it may concern:*

Be it known that we, HUGO JAESSCHIN and OSKAR KALTWASSER, subjects of the Emperor of Germany, residing at Berlin, Germany, and Dessau, Germany, our post-office addresses being Spenerstrasse 6, Berlin, Germany, and Leopoldstrasse 11, Dessau, Germany, have invented certain new and useful Improvements in Monoazo Dye, of which the following is a specification.

Our invention relates to the manufacture of a new monoazo-dye which produces on wool from an acid bath after chroming on the fiber violet shades of very good fastness and which also may serve for production of violet lakes of a remarkable resistance to the action of light. This new dye is a combination product of diazotized 4-chloro-2-aminophenol-6-sulfonic acid with 2-naphthol-3-carboxylic acid and may be obtained as follows, but the invention is not confined to this example. The parts are by weight:

Example: 22.6 parts of 4-chloro-2-aminophenol-6-sulfonic acid are diazotized in known manner by means of 28 parts of hydrochloric acid of 20° Baumé and the diazo compound thus obtained is combined with an aqueous solution of 20 parts of 2-naphthol-3-carboxylic acid and 30 parts of calcined sodium carbonate. When the combination is complete the dye is salted out, pressed and dried. It forms when pulverized a bluish-black powder, dilute solution of which in water is claret, being unaltered by addition of sodium carbonate but assuming a more reddish coloration on addition of soda lye or an acid. In concentrated sulfuric acid it dissolves to a bluish-red solution, from which on addition of ice red-brown flakes of the dye are separated. It dyes wool from an acid bath after chroming violet shades. By action of strong reducing agents the dye is split up yielding 4-chloro-2-aminophenol-6-sulfonic acid and 1-amino-2-naphthol-3-carboxylic acid.

The dye may be transformed into lakes in the usual manner by precipitating the aqueous solution of an alkali salt of the dye with a suitable metallic salt, such as barium chlorid, for instance in presence of a substratum.

Now what we claim is,—

As a new article of manufacture the new monoazo-dye adapted for the production of violet lakes and dyeing wool from an acid bath after chroming on the fiber violet shades, which dye may be obtained by combining diazotized 4-chloro-2-aminophenol-6-sulfonic acid with 2-naphthol-3-carboxylic acid and which dye forms in the dry and pulverized shape of its sodium salt a bluish-black powder, soluble in water to a claret solution, being unaltered by addition of sodium carbonate, but assuming a more reddish coloration on addition of soda-lye or an acid, soluble in concentrated sulfuric acid to a bluish-red solution, from which on addition of ice red-brown flakes of the dye are separated and being split up by action of strong reducing agents yielding 4-chloro-2-aminophenol-6-sulfonic acid and 1-amino-2-naphthol-3-carboxylic acid.

In testimony whereof we have hereunto set our hands in presence of two subscribing witnesses.

HUGO JAESSCHIN.
    OSKAR KALTWASSER.

Witnesses:
    WOLDEMAR HAUPT,
    HENRY HASPER.